(12) United States Patent
Park

(10) Patent No.: US 7,957,278 B2
(45) Date of Patent: Jun. 7, 2011

(54) DETECTION OF SIGNALING FLOWS

(75) Inventor: Daniel J. Park, Beaverton, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 507 days.

(21) Appl. No.: 11/751,345

(22) Filed: May 21, 2007

(65) Prior Publication Data

US 2008/0291828 A1 Nov. 27, 2008

(51) Int. Cl.
*G01R 31/08* (2006.01)
*H04J 1/16* (2006.01)
(52) U.S. Cl. ......... 370/230; 370/235
(58) Field of Classification Search .......... 370/230, 370/235, 412, 261, 231, 392, 352, 389, 395.3
See application file for complete search history.

(56) References Cited

U.S. PATENT DOCUMENTS

| | | | |
|---|---|---|---|
| 6,047,006 A | | 4/2000 | Brakefield et al. |
| 6,104,700 A * | | 8/2000 | Haddock et al. ......... 370/235 |
| 6,272,551 B1 * | | 8/2001 | Martin et al. ......... 709/250 |
| 6,493,336 B1 * | | 12/2002 | Perry et al. ......... 370/352 |
| 7,082,133 B1 * | | 7/2006 | Lor et al. ......... 370/392 |
| 2004/0125757 A1 * | | 7/2004 | Mela et al. ......... 370/261 |
| 2004/0233845 A1 * | | 11/2004 | Jeong et al. ......... 370/230 |
| 2005/0015805 A1 * | | 1/2005 | Iwamura ......... 725/79 |

* cited by examiner

*Primary Examiner* — Derrick W Ferris
*Assistant Examiner* — Maharishi Khirodhar
(74) *Attorney, Agent, or Firm* — Michael Blaine Brooks, PC; Michael B. Brooks; David Ripma

(57) ABSTRACT

The embodiments of the present invention provide for methods, devices, and systems for providing quality of service (QoS) to network data that is received by an intermediate node in a local area network. In general, the embodiments of the present invention generally evaluate network traffic. Certain streams or flows are copied in appropriate buffer areas and accordingly evaluated by their traffic flow characteristics and further evaluated to determine if such streams/flows contain signaling or control information, which may be based on characteristic key words and/or structures. Based on the signaling or control information extracted, the appropriate stream is accordingly assigned or configured for quality of service (QoS) handling.

20 Claims, 6 Drawing Sheets

DETECTION OF SIGNALING FLOWS

FIELD OF THE INVENTION

The embodiments of the present invention relate to streaming audiovisual data in a shared network, particularly to providing quality of service to such streaming data within a network.

BACKGROUND

Internet access, as well as access to digital content, is currently available. For example, consumers may request on-demand movies streamed from the Internet to one of their television sets in their local area network for viewing. Networks where such streaming audiovisual source contents are transported, however, are typically shared such that different source content types may be delivered via such shared networks. Data that gets delivered via this shared network may include various source content types, such as web page data, file transfer protocol (FTP) data, streaming audiovisual data, and other data, which may include control and signaling information. Furthermore, such a shared network may include varying technologies, such as Ethernet and Powerline Communication technologies. A consumer wishing to view streaming audiovisual or multimedia data, particularly movies, over a shared network is typically desirous of wanting the audiovisual data to be delivered with a certain level of quality so as to provide a decent viewing quality.

Audiovisual (AV) streams typically require quality of service (QoS) to provide a reasonable user experience. In some embodiments, some networks provide an auto-connect feature that automatically provides QoS to AV streams. One of the issues for an auto-connect feature within a system is the ability of the auto-connect module to reliably detect an AV stream that may require QoS. Typically, without specific information from the source or destination application, an auto-connect module, e.g., application and/or device, attempting to provide QoS to the one or more data streams in the network, has to detect the existence of the AV stream and also accordingly determine the QoS requirement(s) of that stream. Without this specific information, such as triggers or identifiers, directly from the application, the module configuring the QoS for the stream has to estimate the QoS needs of that stream. A good estimation is desirable considering that the quality of the estimation directly affects the user's experience when viewing the AV stream. Ways of providing quality of service to streaming data are thus highly desirable.

SUMMARY

In one aspect, a method of providing quality of service (QoS) in a network is provided. The method includes the steps of receiving a packet of a set of network data comprising one or more data flows, each flow comprising one or more packets; determining whether said packet associated with a flow from said one or more data flows is a signaling packet based on one or more protocols of said packet; determining whether said packet associated with said flow is a signaling packet based on a bandwidth value associated with said flow and wherein said bandwidth value of said flow is less than a bandwidth threshold; if said packet is a signaling packet based on said one or more protocols and based on said bandwidth value being less than said bandwidth threshold, then copying said packet to a buffer; and determining whether said copied packet in said buffer contains signaling information; if said copied packet contains said signaling information, then performing QoS processing for said flow associated with said packet; removing said packet from said buffer; and computing a new bandwidth threshold.

In another aspect, an intermediate node device, adapted to be connected to one or more devices via a network, is provided. The intermediate node includes a communication module and a quality of service stream filtering and signal determination (QSFSD) module. The communication module is adapted to enable said intermediate node to communicate with said one or more devices via said network. The QSFSD module is adapted to receive a packet via said network, wherein said packet is from a set of network data comprising one or more data flows, each flow comprising one or more packets; determine whether said packet associated with a flow from said one or more data flows is a signaling packet based on one or more protocols of said packet; determine whether said packet associated with said flow is a signaling packet based on a bandwidth value associated with said flow and wherein said bandwidth value of said flow is less than a bandwidth threshold; copy said packet to a buffer, and determine whether said copied packet in said buffer contains signaling information, if said packet is a signaling packet based on said one or more protocols and based on said bandwidth value being less than said bandwidth threshold; perform QoS processing for said flow associated with said packet, if said packet contains said signaling information; remove said packet from said buffer; and compute a new bandwidth threshold.

In another aspect, a system is provided. The system includes a network, an intermediate node device, and a rendering device. The network includes one or more network segments. The intermediate node device is adapted to be connected to one or more devices via said network. The intermediate node includes a communication module and a quality of service stream filtering and signal determination (QSFSD) module. The communication module is adapted to enable said intermediate node to communicate with said one or more devices via said network. The QSFSD module is adapted to receive a packet via said network, wherein said packet is from a set of network data comprising one or more data flows, each flow comprising one or more packets; determine whether said packet associated with a flow from said one or more data flows is a signaling packet based on one or more protocols of said packet; determine whether said packet associated with said flow is a signaling packet based on a bandwidth value associated with said flow and wherein said bandwidth value of said flow is less than a bandwidth threshold; copy said packet to a buffer, and determine whether said copied packet in said buffer contains signaling information, if said packet is a signaling packet based on said one or more protocols and based on said bandwidth value being less than said bandwidth threshold; perform QoS processing for said flow associated with said packet, if said packet contains said signaling information; remove said packet from said buffer; and compute a new bandwidth threshold. The rendering device is adapted to receive said set of network data.

BRIEF DESCRIPTION OF THE DRAWINGS

The embodiments of the present invention are illustrated by way of example and not limitation in the figures of the accompanying drawings, and in which.

DETAILED DESCRIPTION

Figure 1:
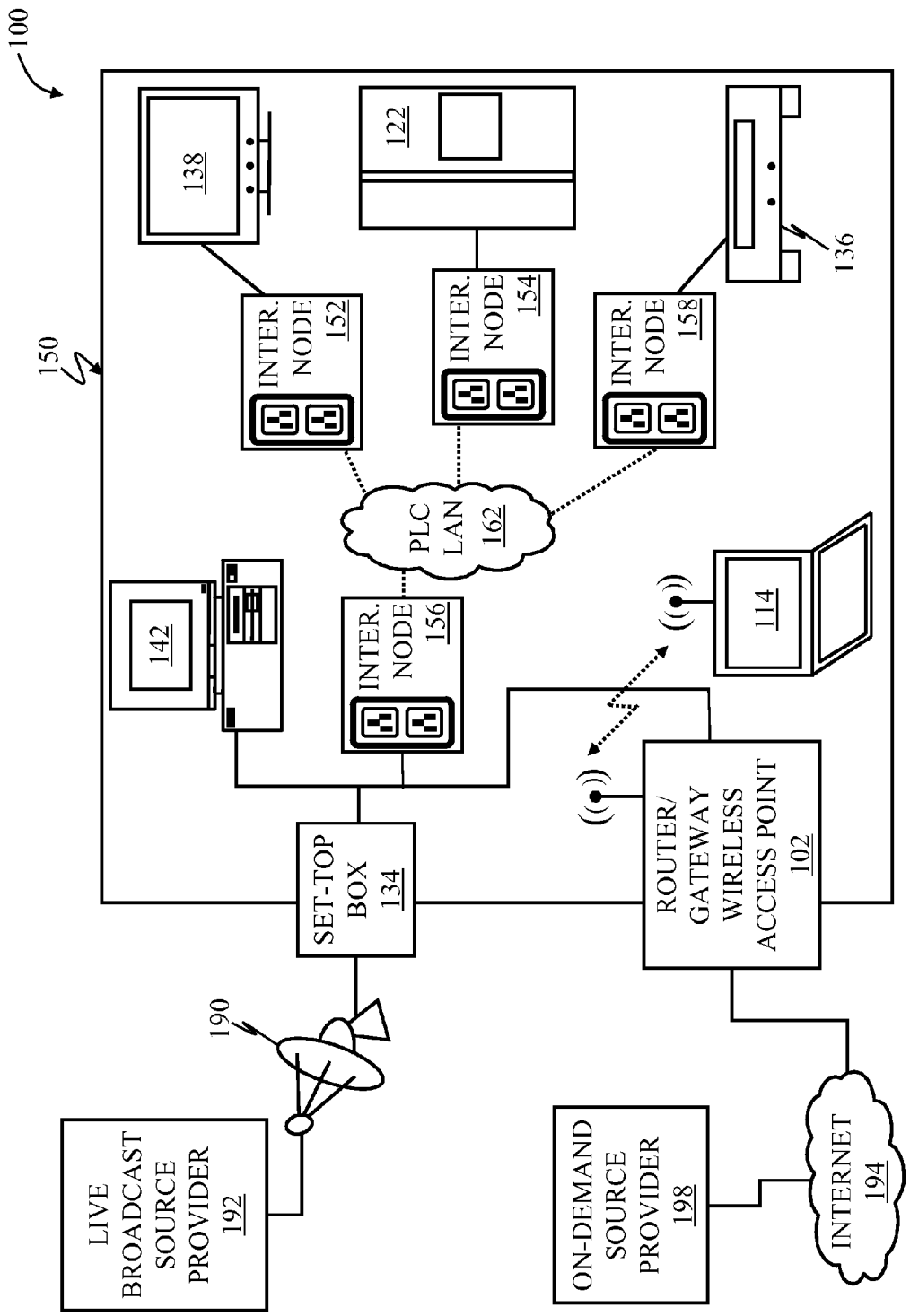
FIG. 1 is a high-level block diagram of an exemplary data communication system, according to an embodiment of the invention.
Figure 2:
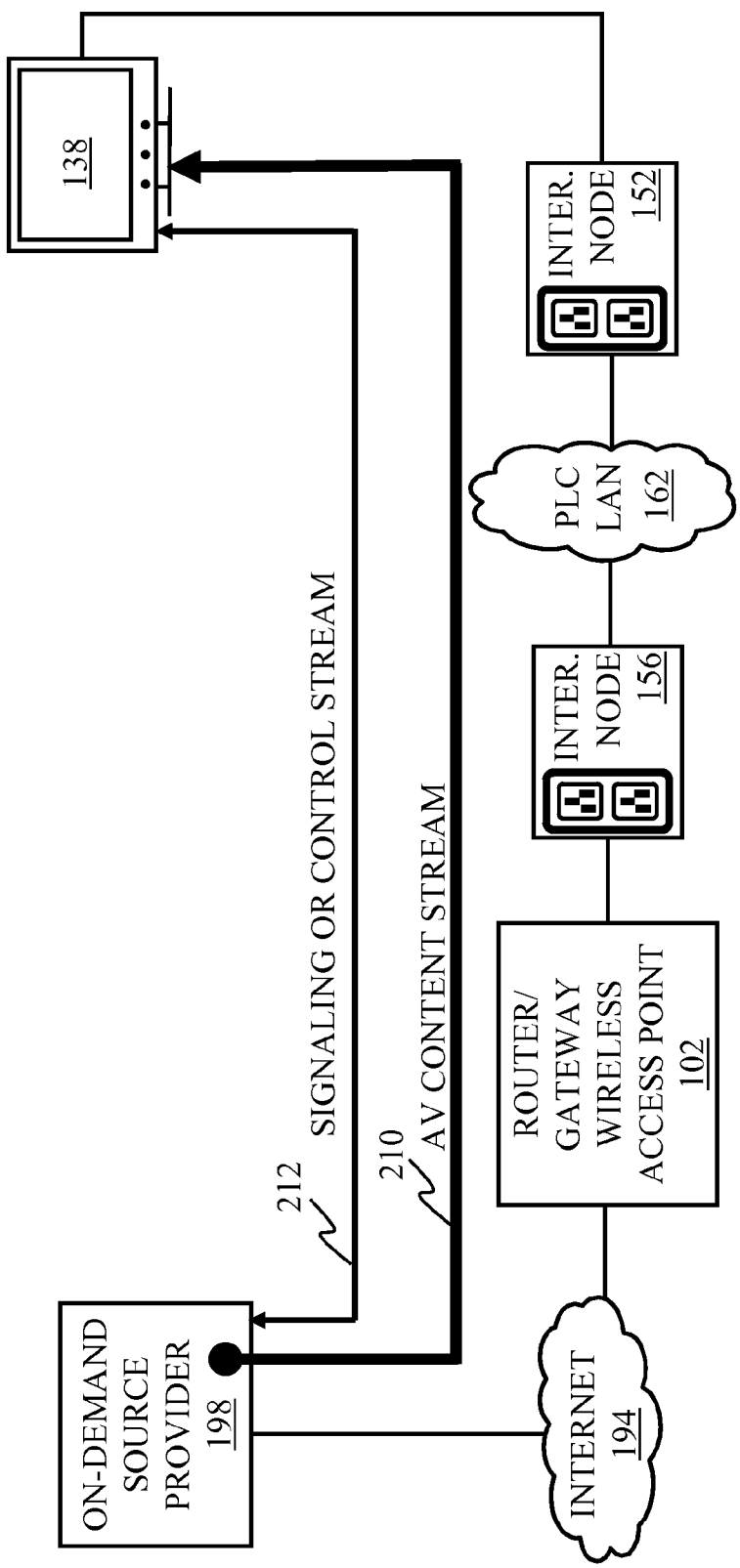
FIG. 2 is a portion of the exemplary data communication system of FIG. 1, showing an exemplary manner in which a source content that is audiovisual data may be transmitted in the exemplary system as network data, according to an embodiment of the invention.

To better understand the figures, reference numerals within the one hundred series, for example, 100 and 152, are initially introduced in FIG. 1, reference numerals in the two hundred series, for example, 210 and 212, are initially introduced in FIG. 2, and so on and so forth.

The embodiments of the present invention generally relate to identifying streaming source contents or media, such as audiovisual data, streaming visual data, streaming audio data, and streaming multimedia data. Streaming media in general is the transfer of source content so that this source content may be received as a continuous real-time stream. Streamed source content elements are typically transmitted by a sender, e.g., a server/server application or sender entity, and received by a receiver, e.g., client/client application or receiver entity. The receiver or client typically may start presenting or playing back the source content as soon as the receiving client application has sufficient data or content elements stored in its receiving buffer. Typically, the client/receiver is simultaneously receiving streaming network data and presenting such streamed network data.

The embodiments of the present invention generally evaluate network traffic. Certain streams or flows are copied in appropriate buffer areas and accordingly evaluated to determine if such streams contain signaling or control information. Based on the signaling or control information extracted, the appropriate stream is accordingly assigned or configured for quality of service (QoS) handling. In other embodiments, control information indicating the start or end of certain content types are being monitored, so that if a start, for example, of an AV content is received by an intermediate node, the appropriate QoS for that AV content stream or flow may be quickly requested. Similarly, if the control information indicates the end of the AV content, the QoS assigned to that AV content stream or flow may quickly be released for possible use for the next AV content stream.

FIG. 1 is a diagram of an exemplary system 100 wherein streaming audiovisual or multimedia digital contents, such as audio and/or visual/image data, are transmitted via one or more networks according to some embodiments of the invention. In this exemplary embodiment, a local area network (LAN) 150 shares bandwidth among the various nodes in the system 100. The various nodes in the system may include senders or sources of data, receivers or clients of data, and intermediate nodes, such as network adapters. In general, a network adapter of the present invention is an intermediate node that converts data from one network technology to another, so as to enable communication between different network types. Furthermore, the intermediate nodes, including network adapters, of the present invention are stand-alone devices or modules that typically do not have access to powerful processors of general-purpose computers, such as Personal Computers (PCs). Examples of such network adapters may include adapters adapted to enable communication between different types of network segments, such as between Ethernet and Powerline Communication (PLC) 152, 154, 156, 158, Ethernet and wireless, such as conforming to the 802.11g specification, and Ethernet and ultra wideband. The network adapters 152, 154 156, 158, exemplified in FIG. 1, provide conversion and communication between an Ethernet network and a PLC network 162, in general. In some embodiments, the stand-alone network adapters of the present invention are deployed in pairs to transfer data over different network segment types of the LAN. For example, there is a source device, e.g., a source device set-top box 134, an Ethernet to a PLC stand-alone network adapter 156, the PLC network 162, a PLC to Ethernet stand-alone network adapter 152, and the destination device, e.g., a digital television (DTV) 138.

The exemplary system 100 may also include a number of consumer electronics, including a set-top box 134, a DTV 138, a wireless personal computer (PC) 142, a digital video or versatile disc (DVD) player 136, a computer laptop 114, gateways/routers 102, a consumer appliance/device 122, and one or more intermediate nodes 152, 154, 156, 158 connected via various network links or segments. Such network segments may also be wired or wireless and may be adapted to support various protocols. These various consumer electronics are typically adapted to be networked with each other. Examples of consumer appliances that may be networked into the system 100 include televisions and refrigerators with user interfaces, including displays, radios adapted to receive streaming source contents, and any other devices adapted to receive source contents via the network and present them accordingly. The local area network 150 may be adapted to support one or more network types—e.g., power line communication (PLC) networks, 802.11a wireless networks, 802.11g wireless networks, 802.11b wireless networks, and Ethernet networks. The local network 150 may also be operably coupled to one or more external source content providers 192, 198, for example, via satellite, cable, and/or terrestrial broadcast 190 or via an external wide area network, such as the Internet 194. Typically, the LAN 150 is coupled to external networks via one or more end-point or edge nodes, such as gateways and/or routers 102. A source content provider 192, 198 may provide pre-encoded and stored source content and/or live or real-time encoded source content to be streamed and received by a receiver/client and accordingly be presented in a user interface.

In some embodiments, audiovisual (AV) data, such as a movie, may be requested from a source provider 198 that provides on-demand pre-encoded and stored data and/or live data. Typically, the on-demand movie is presented on a presentation device after a small portion of the on-demand movie is stored in the appropriate buffer. For example, a streaming source content received from an external network or source may be received by a set-top box 134. The set-top box 134 then transmits the streamed audiovisual movie via one or more intermediate nodes, e.g., an Ethernet to PLC stand-alone network adapter 156 and/or a PLC to Ethernet stand-alone network adapter 152, to the digital television 138 for presentation. In other embodiments, the source of the streaming data may be within the LAN 150 itself, for example, from a computer 142 with a stored audiovisual file, e.g., a movie on a Digital Versatile Disk (DVD). The computer 142 may stream the stored AV file via intermediate node 156, then to intermediate node 152 to the operably coupled digital television set 138. The movie is typically presented on a presentation device when sufficient AV data is stored in an appropriate buffer, and typically while the buffer is still receiving other related AV data.

The intermediate nodes of the present invention are nodes adapted to perform the quality of service (QoS) stream filtering and signal determination (QSFSD) processes described herein. These intermediate nodes may, in some embodiments, be also configured to function as network adapters and, in other embodiments, not. These intermediate nodes of the present invention, in general, receive the network data, evaluate such streams, and accordingly configure the appropriate streams or flows for QoS processing, including delivery and/or handling, if appropriate.

Furthermore, for intermediate nodes in a shared network, the embodiments of the present invention provide for a low-complexity means of identifying which network data flows or streams may potentially carry streaming source content signaling or control information. Moreover, because the QSFSD processes described herein are generally of low-complexity, a low-power and typically inexpensive processor may be incorporated in the exemplary intermediate nodes of the present invention. Furthermore, the exemplary QSFSD processes described herein may quickly detect, control, or signal information indicating the start or end of AV streams, thereby enhancing the user experience. By identifying these streaming source contents that may require quality of service (QoS), these source contents may accordingly be provided special handling so as to provide a certain level of quality, typically thereby enhancing a consumer's experience. The embodiments of the present invention also provide exemplary intermediate nodes, which may be network adapters, which are adapted to potentially process streaming source content data, particularly AV and multimedia data, typically without copying or buffering all network data or traffic crossing such intermediate nodes.

FIG. 2 is the exemplary system 100 of FIG. 1 but with lesser details, according to an embodiment of the invention. In this exemplary embodiment, an on-demand source provider 198 provides streaming on-demand movies to a user via the digital television 138. One of ordinary skill in the art will appreciate that the on-demand movie or source content delivered as network data may be embodied as one or more streams, which may include a content stream 210, e.g., an AV content stream, and a signaling or control stream 212. The content stream 210, in this example, may contain the actual AV data itself, e.g., the movie, and the signaling or control stream 212 may contain signaling or control information associated with the AV stream 210. The content stream 210 and signaling stream 212 may be delivered and/or received as separate streams. In other embodiments, these streams 210, 212 may be received as one stream, interleaved with each other or with other network data.

Various protocols are currently available to transport and/or control streaming source contents particularly AV data. Real Time Streaming Protocol (RTSP) is one example of an application-layer protocol for controlling the delivery of data with real-time properties, such as streaming source contents or media, which may include audio and/or video. Such sources of streaming data may include live data feeds and/or stored data. In general, RTSP enables a client or receiver to remotely control a streaming media server, by issuing commands/requests, such as "play," "pause," and "setup." RTSP may be construed to be a client-server multimedia presentation control protocol. Internet Protocol (IP) is a network layer protocol, which generally specifies the format of packets—also called datagrams, and the addressing scheme. IP may be combined with a higher-layer or network protocol, such as Transmission Control Protocol (TCP) and User or Universal Datagram Protocol (UDP). RTSP also provides control over multiple data delivery sessions, e.g., multicast UDP and TCP, and also provides a means for choosing delivery mechanisms, for example, based upon the real-time transport protocol (RTP). TCP generally establishes a virtual connection between a sender/server/source and a destination/receiver/client, and provides data delivery reliability. UDP, on the other hand, is a connectionless protocol and generally does not provide the reliability of TCP.

For illustrative purposes, the embodiments discussed herein are related to RTSP, but other signaling or control protocols, such as, but not limited to, Session Initiation Protocol (SIP), IPSP, and Universal Plug and Play (UPnP), may be applied and yet still be in the scope of the present invention. Proprietary and non-proprietary protocols may also be applied. IPSP is a suite of protocols that includes RTSP and the Session Description Protocol (SDP), which is a media description protocol that may be incorporated within RTSP, SIP, and other protocols. SDP may be applied to describe multimedia sessions for the purposes of session announcement, session invitation, and other forms of multimedia session initiation. SDP is generally provided with keywords and a format structure that may easily be read and/or extracted from a signaling stream. Signaling streams conforming to RTSP and most other signaling protocols have characteristics that may be determined or evaluated by intermediate nodes in the signaling path of the present invention, but typically not by end nodes. Generally, a signaling stream may be characterized as being of low bandwidth, bursty, and the individual messages and/or packets tend to be short in length. The intermediate nodes of the present invention are adapted to detect the presence of a signaling stream and then accordingly decode such a stream, so as to quickly establish and/or remove QoS-handling for the AV streams associated with the decoded or evaluated signaling stream.

In this example, the AV content stream 210 and the signaling stream 212 are sent from the on-demand source provider 198 and are delivered via the Internet 194. These streams 210, 212 are then delivered to a local area network 150 via the router 102, a first intermediate node 156, the power line communication (PLC) LAN 162, a second intermediate node 152, and then to the DTV 138. Control information from the user or client may also accordingly be transmitted back to the on-demand source provider 198 via a signaling or control stream 212. Client-side control instructions, such as RTSP PLAY and PAUSE, for example, may be transmitted 212 from the client 138 to the source 198. Similarly, source or server-side instructions, e.g., RTSP SETUP or TEARDOWN, may be transmitted 212 by the server/source 198 to the client 138.

Figure 3:
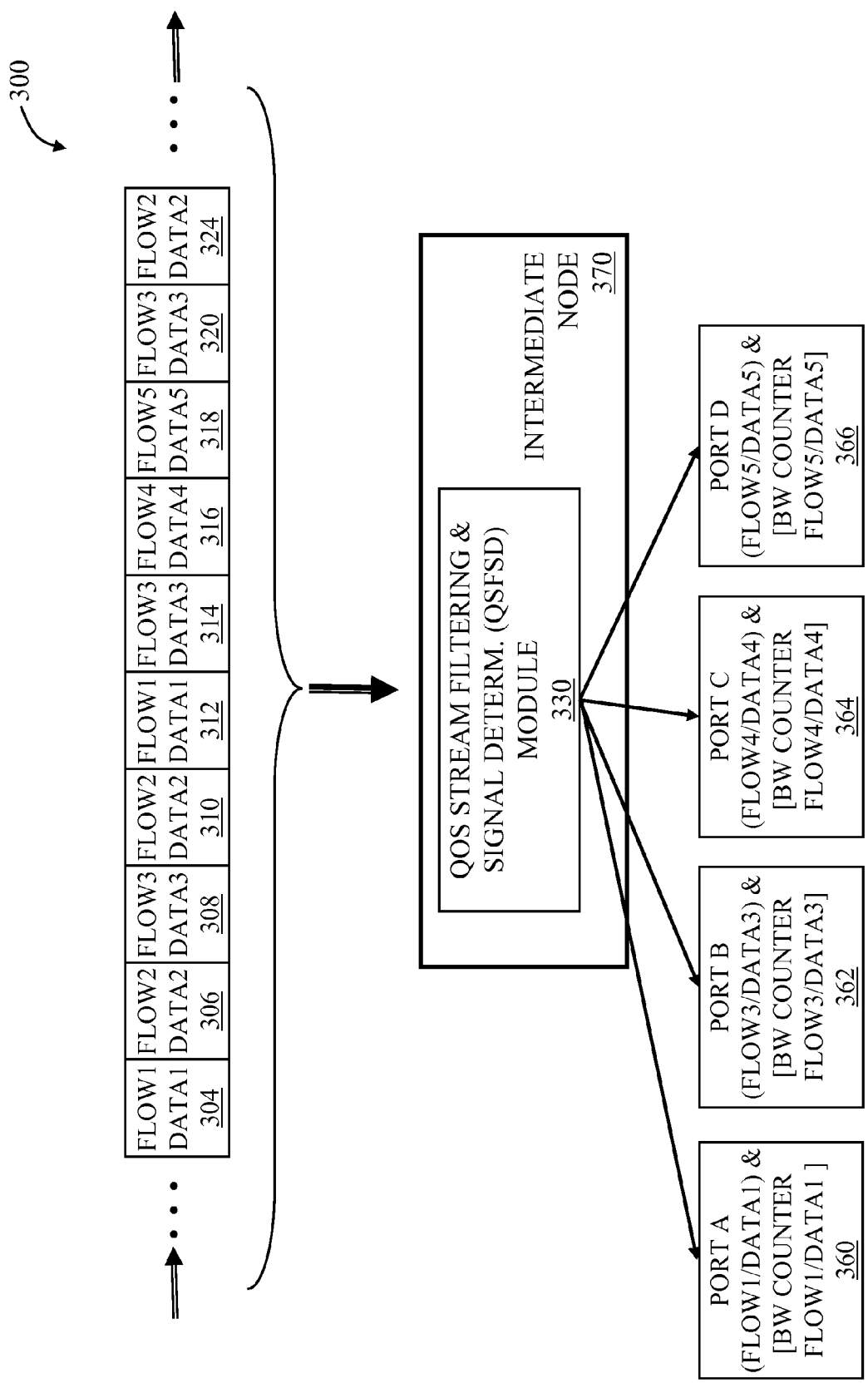
FIG. 3 is a high-level block diagram representing exemplary network data, according to an embodiment of the invention.

FIG. 3 is an exemplary diagram 300 illustrating an exemplary representation of network data delivered over a network 150 and a manner in which network data may be processed according to an embodiment of the invention. One of ordinary skill in the art will appreciate that network data may include multiple source contents, e.g., web page data and AV movie data, as that network data is transported via the network. These various source contents are transmitted as separate flows or data streams. One of ordinary skill in the art will appreciate that these flows or data streams may be transmitted as packets or datagrams, or based on other packetizing format and/or data transmission.

Network data delivered via network segments of the network may cross an exemplary intermediate node embodiment 370 of the present invention. The intermediate node 370 may be a device used to forward or transfer traffic from one LAN segment to another LAN segment, where the LAN segments may or may not be of the same type. The intermediate node transports network data, which may include AV source content. This intermediate node 370, in addition, for example, to performing other functions, such as network adapter functions, may also be capable of reading and processing data crossing such node 370, and determining which data may potentially be a signaling stream/flow or signaling packet.

This exemplary network data of FIG. 3 includes a number of source contents, each represented as a data flow or data stream. For example, an AV source content is a streaming source content data that is divided into a number of packets, e.g., flow1/data1 304, 312. These various packets 304, 312 are all related to each other and associated with an AV source content. In this example, there are five data flows, flow1/data1 304, 312, flow2/data2 306, 310, 324, flow3/data3 308, 314, 320, flow4/data4 316, and flow5/data5 318, e.g., flow1/data1 is an AV stream and flow2/data2 is a web page data stream. The network data received by the intermediate node 370 is processed by the QSFSD module 330 of the present invention. Depending on conditions, such as bandwidth, data packet type, and/or transport protocol applied, some flows are copied to memory or a buffer area. In general, each flow is identified or associated with its corresponding port number. In general, certain applications are associated with particular ports. For example, the hypertext transfer protocol (HTTP) typically uses port 80 for transmission of TCP/IP packets and RTSP typically uses port 554.

In this example, flow1/data 1 304, 312 associated with Port A, e.g., port 554, is stored in a buffer 360 for further processing by the QSFSD module 330. Furthermore, flow3/data3 308, 314, 320 associated with Port B, flow4/data4 associated with Port C, and flow5/data5 associated with Port D, are stored in appropriate buffer areas 362, 364, 366, respectively. In this exemplary embodiment, packets associated with flow2/data2 306, 310, 324 are not copied to a buffer for further QSFSD processing. Furthermore, network data 304-324 received by the intermediate node 370, after copying to the buffer, if appropriate, is then transmitted typically immediately to the designated receiver.

In addition to having certain flows temporarily stored in buffer areas, a bandwidth (BW) counter for each flow associated with a port is also accordingly maintained and/or updated 360, 362, 364, 366. This exemplary BW counter is typically reset to zero when a new flow or source content associated with a port is received. The QSFSD module also typically evaluates each flow stored in the buffer. If control or signal information is extracted from such buffered or copied data, appropriate QoS requests and/or handling may be performed and/or requested. For example, a QoS classifier may be updated so as to ensure that the flow associated with the extracted control or signaling information is configured for QoS handling and processing.

Figure 4:
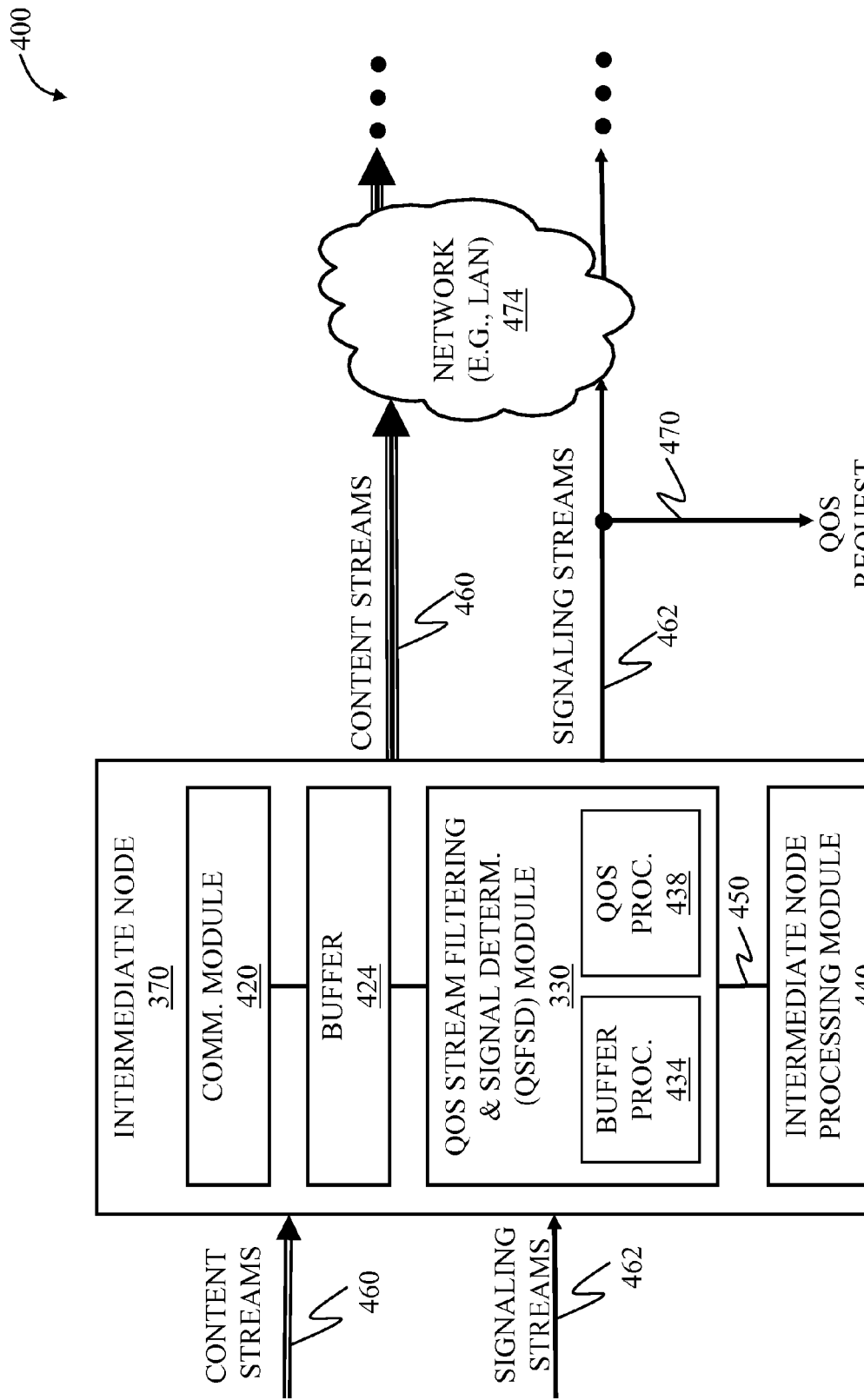
FIG. 4 is a high-level data flow illustrating a manner of assigning quality of service (QoS) to a data flow, according to an embodiment of the invention.

FIG. 4 is an exemplary diagram 400 illustrating an exemplary high-level data flow of an embodiment of the present invention. Network data being delivered to and received by the exemplary intermediate nodes 370 of the present invention may include content streams 460, e.g., an AV content stream, and signaling or control streams 462. Network data 460, 462 are received and processed by the intermediate node 370, which is in the network delivery path for delivering the network data to the designated client(s). One of ordinary skill in the art will appreciate that various network data types may be received by the intermediate node, such as, but not limited to, streaming AV data, file transfer protocol (FTP) data, web page data, and text data.

An intermediate node 370 of the present invention may include a communication module 420 enabling the intermediate node 370 to communicate via the network. Such communication module 420 may be embodied as a network interface card, with appropriate program logic, for example. The intermediate node may also include a data store 424, such as a buffer, for storing copies of network data 460, 462. The intermediate node 370 may also include a QoS stream filtering and signal determination (QSFSD) module 330 adapted to perform the QSFSD processes described herein. In some embodiments, the QSFSD module 330 may include a buffer processor 434 module configured to parse and filter the received network data, and accordingly store the appropriate network data in the buffer. The QSFSD module 330 may also include a QoS processor module 438 configured to read the buffer and extract signal or control information from packets stored in the buffer, and accordingly request QoS handling and/or processing for the appropriate network data streams or flows. The intermediate node 370 may also include an intermediate node processing module 440 configured to perform the general functions of this intermediate node. For example, if this intermediate node 370 is an Ethernet to PLC adapter, the intermediate node processing module 440 may be a network adapter processing module configured so as to be adapted to perform Ethernet to PLC adapter functions. Typically, these modules 420, 424, 330, 434, 438, 440 may communicate with each other via a shared memory, a data line, a bus, dedicated signal paths, or one or more channels 450. Furthermore, these modules may be embodied in hardware, as a set of program instructions, e.g., software, or both, i.e., firmware. Other modules may also be included, not shown, which may depend on the functions of the intermediate node 370.

The QSFSD module 330 processes the received network data 460, 462 that are received by the intermediate node 370. Depending on certain conditions, some streams are copied to the buffer by the buffer processor module 434. The received network data 460, 462 are typically quickly delivered to the output interface, e.g., via the communication module 420, so as to enable the intermediate node to quickly transmit the received network data to the designated client(s) or receiver(s) via one or more network segments 474. If the QoS processor module 438 is able to extract or read signaling or control information from the buffered or copied streams/flows, the QoS processor module may also accordingly transmit QoS requests 470, so as to provide QoS handling to the appropriate network data or streams.

Figure 5:
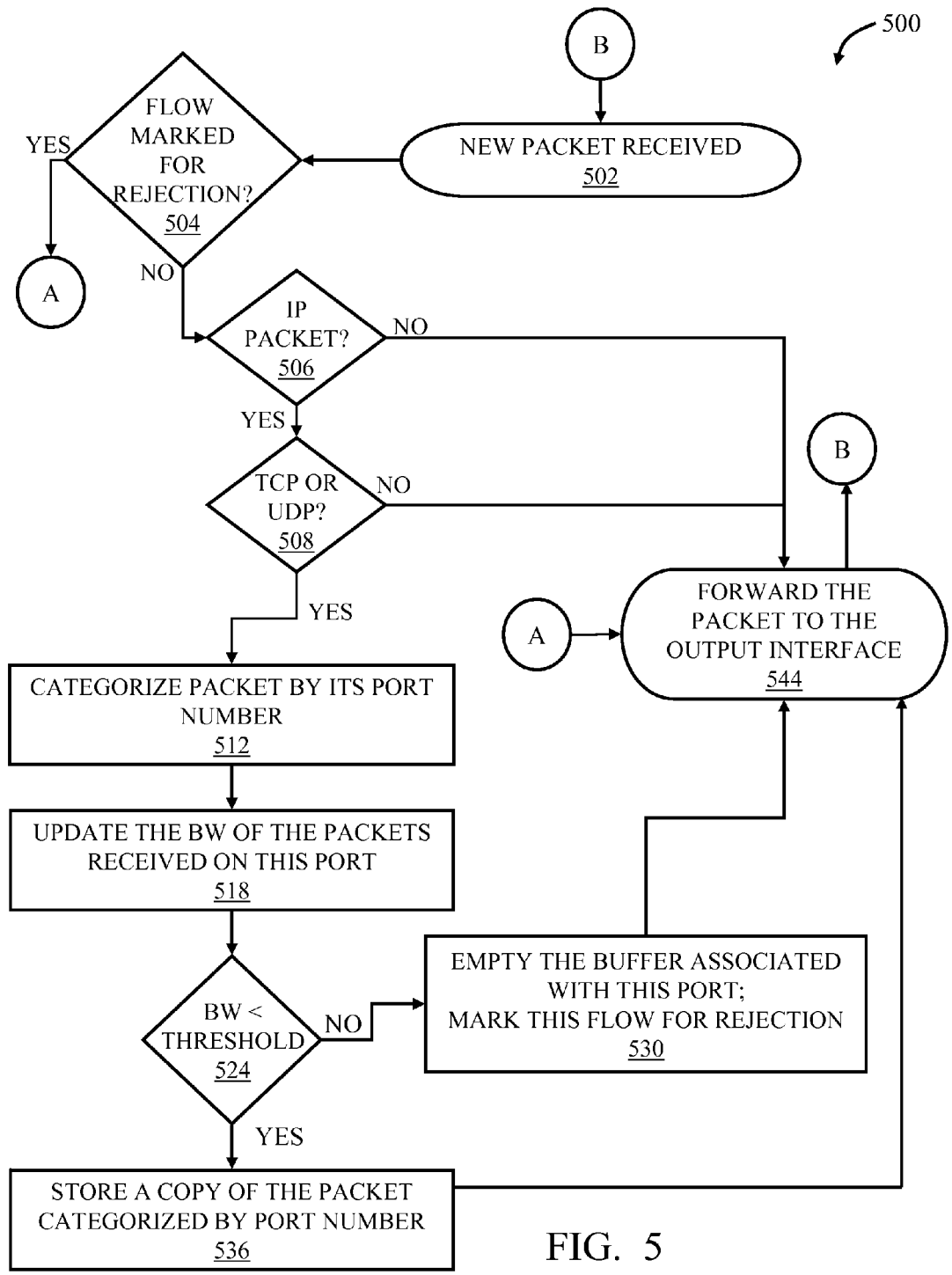
FIG. 5 is a high-level flowchart of an exemplary process which may be performed by a buffer processor module of an exemplary quality of service stream filtering and signal determination (QSFSD) module, according to an embodiment of the invention.

FIG. 5 is a high-level flowchart 500 of an exemplary process that may be performed by an exemplary buffer processor module 434 of an intermediate node 370, according to an embodiment of the present invention. In some embodiments, to minimize cost, for example, an intermediate node may be designed so as to be implemented with a low-power processing unit. In this exemplary embodiment, the buffer processor module 434 of the QSFSD module 330 may be adapted to perform a process such that a vast majority of packets received from the LAN may be quickly eliminated and deemed as not signaling stream packets. Although the embodiments of the present invention are discussed in relation to packets, other ways of packetizing and/or dividing a source content may also be performed and yet still be in the scope of the present invention. Furthermore, other network data units and/or types may also be processed by the QSFSD module and still be in the scope of the present invention.

In general, once a new packet is received (operation 502), the buffer processing module 434 checks if the flow/stream associated with or of the packet has been previously marked for rejection (operation 504). If the flow associated with that packet has been previously marked for rejection (operation 504, "yes" branch), the packet is typically immediately forwarded to the output interface for transmission to the designated receiver(s) (operation 544). Otherwise (operation 504, "no" branch), a check is then made to determine if the packet received is an Internet Protocol (IP) packet (operation 506). This determination may be performed, for example, by checking the header information associated with that packet. Packets may be received with certain formats, for example, a packet header may contain or indicate several fields, such as EtherType, Source Internet Protocol (IP) address, Destination IP address, Source Port, and Destination Port. EtherType is typically a field in the Ethernet networking standard indicating the protocol being applied to transport the packet in an Ethernet frame, for example. Other processes of determining if the packet received is an IP packet are known to those skilled in the art.

If the packet is not an IP packet (operation 506, "no" branch), the received packet is immediately delivered to the output interface for further transmission by the intermediate node (operation 544). On the other hand, if the packet is an IP packet (operation 506, "yes" branch), another check is made to determine if the received packet is a TCP or UDP packet (operation 508). This determination may be made by inspecting the "protocol" field in the IP header, e.g., values of "6" for TCP and "17" for UDP, respectively. If the IP packet is not a TCP/IP packet and is not a UDP/IP packet (operation 508, "no" branch), the received packet is then delivered to the output interface for further transmission (operation 544). The intermediate node of the present invention thus quickly transmits data that the QSFSD module has marked or identified as a non-signaling or non-control stream.

If the packet received, however, is a TCP/IP or UDP/IP packet (operation 508, "yes" branch), the buffer processor module 434 of the QSFSD module 330 accordingly categorizes the received packet by its port number, which may also include the protocol type, e.g., for TCP or UDP (operation 512). Generally, a port is a special number present in the header of a data packet. Port numbers may be used to map data to a particular process running on a computer. In both TCP and UDP, each packet header typically specifies a source port and a destination port, as well as the source and destination network address. Applications implementing common services typically listen to a specific port number, which has been defined by convention. For example, the port number assigned to TCP and UDP for RTSP is the port number 554. One of ordinary skill in the art will appreciate that there are well-known ports, registered ports, and dynamic and/or private ports. The embodiments of the invention generally apply to all types of ports, so long as a port number may uniquely identify a flow.

By performing the TCP/UDP check (operation 508), the QSFSD module 330, particularly the buffer processor module 434, may quickly eliminate some of the network data that are potentially not carrying signaling information. Furthermore, after having filtered the network data so as to identify whether the received packet is a TCP/IP or UDP/IP packet, the buffer processor module 434 may perform another set of operations such that high bandwidth traffic flows or streams are eliminated. Typically, packets associated with a signaling stream have a low bandwidth demand. In some embodiments, this exemplary layered or phased approach of eliminating traffic from consideration as signaling/control streams/flows may reduce the central processing unit (CPU) load and other resource demands to a manageable level.

In some embodiments, each port number is associated with a bandwidth (BW) counter that keeps track of the bandwidth, e.g., of a source content or flow/stream associated with that port number. The BW counter is typically reset when a new flow or stream is received at the same port. Furthermore, one of ordinary skill in the art will appreciate that there are many ways of calculating the bandwidth. In some embodiments, a bandwidth may be calculated, for example, by a formula:

$$BW = (Tot\_Flow\_Bytes / Sampling\_Period)$$
where
$Tot\_Flow\_Bytes$ = total number of bytes received for that flow in the sampling period; and
$Sampling\_Period$ = sampling period.

The BW counter associated with that port number and flow is accordingly updated based on the size of the packet received (operation 518). A check is then made whether the value of the BW counter is less than a threshold value (operation 524). This threshold may be predefined or may be based on conditions, such as resources available to the QSFSD process, for example. If the BW counter value associated with that port is less than the threshold (operation 524, "yes" branch), a copy of the received packet is accordingly stored in the buffer, categorized based on the port number (operation 536), and the received packet accordingly transmitted to the designated receiver(s) (operation 544). If the BW counter value, however, is greater than or equal to the threshold value (operation 524, "no" branch), the buffer or memory space associated with the port number of the received packet, including packets stored in that buffer area, is accordingly emptied or deleted, and the flow/stream associated with that packet is accordingly marked for rejection (operation 530). Such threshold value, for example, may be based on the available resources allocated for the QSFSD process. In general, the stream/flow is marked as not a signaling/control stream and is no longer copied or processed for further analysis. The packet is also accordingly transmitted to the designated receiver(s) (operation 544). This process is typically repeated every time a new packet is received, as shown.

In some embodiments, if the packets for a flow arrive at the intermediate node at a rate greater than may be processed for RTSP or other signaling protocols (operation 524), then the buffered packets for this flow are accordingly discarded or deleted, and further buffering of packets for this flow is stopped, e.g., by indicating that this flow is marked for rejection (operation 530). The inability to process the totality of packets arriving for a flow may be detected by observing that not all the packets received in a processing slice of time were properly analyzed. In one embodiment, the intermediate node processing module 440 may be configured to allocate its processing cycles to high-priority tasks, such as moving data packets from input interfaces to output interfaces, and interacting with the user. The processes of the QSFSD module, in particular of the QoS processor module 438—for processing received packets for signaling detection may be configured as a very low priority task, and therefore this process is typically provided a relatively short slice of time to complete its work before the processor stops the QSFSD process so as to work on higher priority tasks. When the task resumes at some time later, if there are packets remaining in the buffer that have not been analyzed, then packets are arriving at a higher rate than may be currently handled by the processor. Described in another way, the QSFSD process of the present invention may be assigned the lowest priority and thus the QSFSD process may starve for CPU cycles. If the demand for CPU cycle is too high, in this case, the threshold is set to a lower threshold to reduce the number of packets that are analyzed so as to enable the low-priority QSFSD process to handle the load. On the other hand, if all the packets are being analyzed, the threshold may be increased to process more packets. By quickly eliminating flows with high bandwidth, the device resources of the intermediate node, for example, are made available to analyze traffic flows that are more likely to be signaling flows. In some embodiments, there is no need to artificially set a bandwidth limit or threshold. The CPU processing power/resource may be utilized so that as much resources available from the CPU, e.g., as provided by the operating system, may be applied to analyze packets and/or network data. When the CPU resource runs out, the streams with the largest demand and, therefore, the least likely to be signaling flows may be eliminated. In some embodiments, the allocation of possibly excess resources to the processing of network data, particularly to the parsing and extracting of signaling information, provides for a "soft" bandwidth threshold that may be adjusted. As part of design consideration, the CPU processing power/resource of an intermediate node may also be increased in devices that are exposed to signaling streams that are greater in bandwidth, e.g., in enterprise or server networks.

Figure 6:
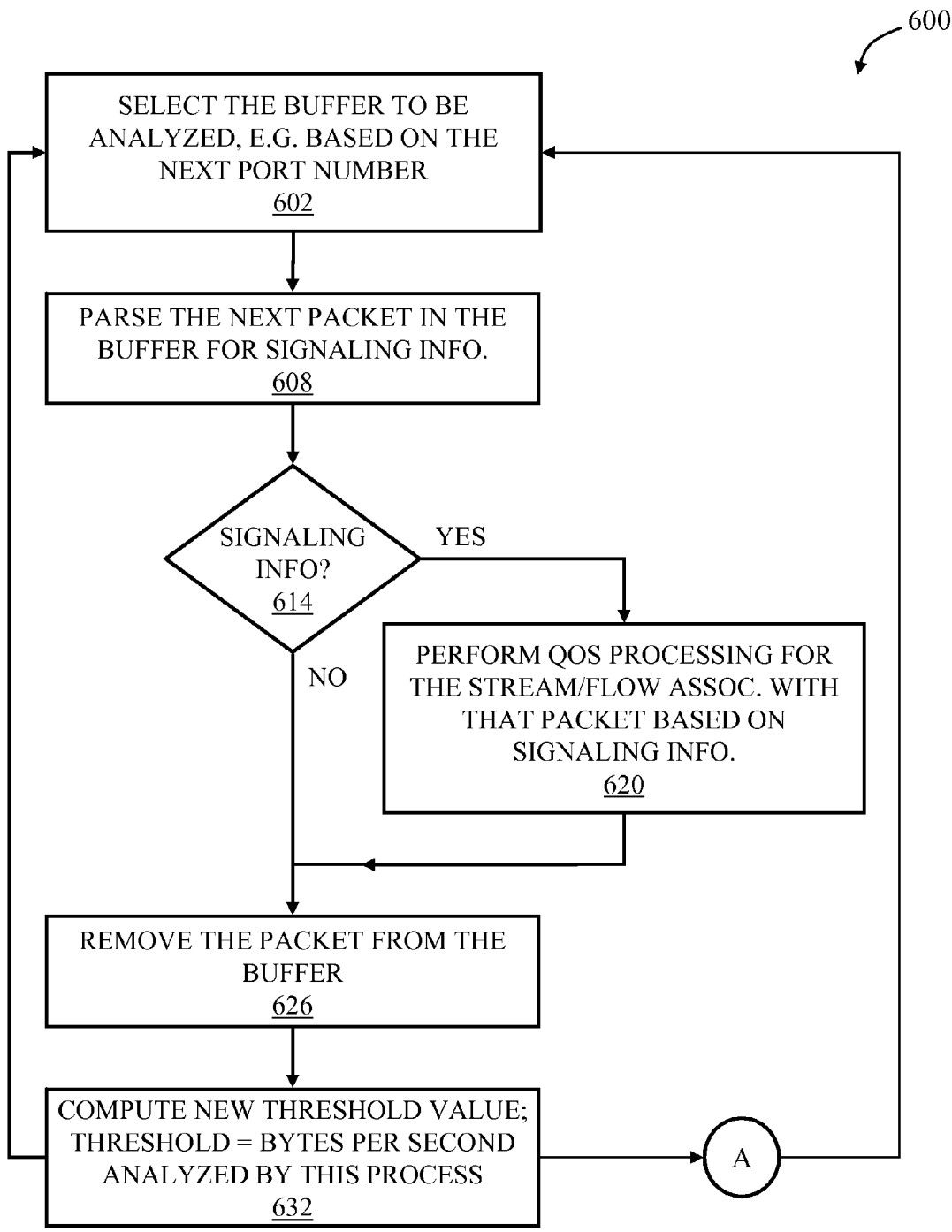
FIG. 6 is a high-level flowchart of an exemplary process which may be performed by a QoS processor module of an exemplary QSFSD module, according to an embodiment of the invention.

FIG. 6 is a high-level flowchart of an exemplary process 600 that may be performed by a QSFSD module 330, in particular by a QoS processor module 438, according to an embodiment of the invention. Streams that have passed the typically low-bandwidth tests 500 performed by the buffer processor module 434 are then typically further analyzed, for example, by the QoS processor module 438 for signaling characteristics or information. In some embodiments, the exemplary process 600 of the QoS processor module may be a continuous background process that analyzes, typically low bandwidth, packet streams for signaling information. The BW threshold (see operation 524) to eliminate a stream from consideration for signaling information may also be set by this exemplary procedure based, for example, on the number of bytes per second that the intermediate node is currently configured to or is able to analyze.

In general, the QoS processor module analyzes 438 the buffered/stored packets. The order of such analyses may be based on the port number, for example. Other means, including order, of analyzing the stored packets are expected and still be in the scope of the present invention.

In the first operation, the QoS processor module 438 selects the buffered packet to be analyzed, which may be based on the port number (operation 602). In the next operation, that packet in the buffer associated with that port number is evaluated and/or parsed for signaling information (operation 608). Such evaluation may be based on the protocol of such packet. For example, in RTSP, the packet typically contains a string of the form "CSeq: <integer>." The Cseq header and/or field is typically included in each RTSP request sent, thereby providing an indication or a signature string that the packet is a signaling stream, i.e., contains signaling or control information. One of ordinary skill in the art will appreciate that other protocols may be defined in such a way that signaling information may be extracted from such protocol data. For example, in UPnP, control or signaling streams or messages, are typically expressed in the Extensible Markup Language (XML) thereby providing a defined structured and/or format. Furthermore, a control or signaling stream of SIP, for example, has a structure that has key words and/or fields that may be extracted and/or read for control information. If no signaling information is read/extracted from the packet in the buffer (operation 614, "no" branch), that packet is deleted/removed from the buffer (operation 626). Furthermore, a new threshold value for the bandwidth threshold is calculated (operation 632). This threshold value (applied in operation 524) may be based on the number of bytes per second that the QoS processor module 438 is currently able to analyze/process. If the QoS processor module is currently not completing its analysis/processing task, i.e., the number of packets processed is generally low, then the bandwidth threshold value may be lowered to help eliminate a greater number of flows, and their associated packets from analysis. The threshold may also be increased to accommodate more packets to be processed, particularly by the QoS processor module 438. On the other hand, if signaling information is read/extracted from the buffered packet (operation 614, "yes" branch), QoS processing for that stream or flow associated with that packet is accordingly performed (operation 620). In general, the "signature string" indicating control or signaling information is read and/or extracted from the buffered packet (operation 614). Such QoS processing may include sending out appropriate QoS requests 470, which may be based on the read/extracted signaling information. Such QoS processing may include, for example, in a PLC network, having the QoS processor module 438 define a connection specification for such flow/stream, which may include specifying parameters defining or configuring a manner in which such future data flows/streams coming in through the intermediate node 370 are to be handled. In other embodiments, the QoS processor module may send a QoS request to the MAC and/or PHY layer as a command, for example. In other embodiments, classifiers and/or policy databases, for example, may be updated based on the signaling information read from the packet. Other QoS processes may also be performed such that flow(s)/stream(s) associated with the read packet are provided some type of priority handling or processing. In other embodiments, the extracted signaling information may indicate that the associated AV stream has been requested to be stopped, e.g., RTSP TEARDOWN. In this exemplary embodiment, the QoS processing performed may actually be configuring the stream for non-QoS handling. By detecting the end or termination, for example, of the AV stream, appropriate resources may quickly be released for other appropriate network data, such as the next AV stream. After reading the buffered packet, the exemplary process 600 is typically repeated for another buffered packet, as shown.

Although the embodiments of the present invention have been exemplified in relation with RTSP, the embodiments of the present invention may also apply to other signaling protocols, such as, but not limited to, SIP, IPSP and UPnP. One of ordinary skill in the art will appreciate that the format of a packet may depend on the protocol being applied. Thus, the embodiments of the present invention may have to be modified to consider the specific format of the protocol.

Embodiments of the present invention may be used in conjunction with networks, systems, and devices that are adapted to employ intermediate nodes. Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. For example, one of ordinary skill in the art of programming may perform the exemplary processes described herein in a different order, use different memory locations and variables—e.g., as linked lists, data structures, and/or separate variable locations, and/or modify the steps performed, and yet still be in the scope of the present invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of providing quality of service (QoS) in a network, the method comprising the steps of:
   receiving a packet of a set of network data comprising one or more data flows, each flow comprising one or more packets;
   determining whether said packet associated with a flow from said one or more data flows is a signaling packet based on one or more protocols of said packet;
   determining a bandwidth value of said flow;
   determining whether said packet associated with said flow is a signaling packet based on the determined bandwidth value of said flow and wherein said determined bandwidth value of said flow is less than a quality of service processing bandwidth threshold comprising a quality of service processing bandwidth threshold value based on a number of bytes processed per second by at least the step of determining whether said packet associated with a flow from said one or more data flows in a signaling packet;
   determining if said packet is a signaling packet wherein the determining as to whether said packet is a signaling packet is based on said one or more protocols and based on said determined bandwidth value being less than said quality of service processing bandwidth threshold, and if said packet is determined to be a signaling packet, then copying said packet to a buffer; and
      determining whether said copied packet in said buffer contains signaling information; and
   if said copied packet contains said signaling information, then performing QoS processing for said flow associated with said packet.

2. The method of claim 1 further comprising the steps of removing said packet from said buffer; and determining a new quality of service processing bandwidth threshold value for the quality of service processing bandwidth threshold; and wherein the steps of claim 1 are repeated for another packet of said set of network data.

3. The method of claim 1, wherein said step of determining whether said packet is a signaling packet based on one or more protocols is based on said packet being an Internet Protocol (IP) packet.

4. The method of claim 3, further comprising the step of:
   if said packet is not a signaling packet based on said packet not being an IP packet, then transmitting said packet to a designated receiver without storing said packet in said buffer.

5. The method of claim 3, wherein said step of determining whether said packet is a signaling packet based on one or more protocols is based on said packet also being a Transmission Control Protocol (TCP) packet or a User Datagram Protocol (UDP) packet.

6. The method of claim 5, further comprising the step of:
   if said packet is not a signaling packet based on said packet not being a TCP/IP packet or a UDP/IP packet, then transmitting said packet to a designated receiver without storing said packet in said buffer.

7. The method of claim 1 further comprising the step determining a new quality of service processing bandwidth threshold value for the quality of service processing bandwidth threshold; and wherein the step of determining a new quality of service processing bandwidth threshold value is based on a number of bytes processed per second by at least the step of determining whether said packet associated with a flow from said one or more data flows is a signaling packet.

8. The method of claim 1, wherein said step of performing QoS processing for said flow comprises updating a classifier.

9. The method of claim 1, wherein said step of performing QoS processing for said flow comprises configuring said flow associated with said packet for non-QoS handling.

10. The method of claim 1, wherein said packet is a real time streaming protocol (RTSP) packet.

11. The method of claim 10, wherein the step of determining whether said copied packet in said buffer contains signaling information comprises searching for a Cseq field of said packet.

12. The method of claim 1, further comprising the step of:
   performing network adapter functions comprising converting said packet from a first network type to a second network type.

13. An intermediate node device adapted to be connected to one or more devices via a network, comprising one or more network segments, the intermediate node comprising:
   a communication module adapted to enable said intermediate node to communicate with said one or more devices via said network; and
   a quality of service stream filtering and signal determination (QSFSD) module adapted to:
      receive a packet via said network, wherein said packet is from a set of network data comprising one or more data flows, each flow comprising one or more packets;
      determine a bandwidth value of said flow;
      determine whether said packet associated with said flow is a signaling packet, wherein said packet is determined to be a signaling packet based on one or more protocols of said packet and based on the determined bandwidth value of said flow being less than a quality of service processing bandwidth threshold comprising a quality of service processing bandwidth threshold value based on a number of bytes processed per second by at least the step of determining whether said packet associated with a flow from said one or more data flows in a signaling packet;
      copy said packet to a buffer, and determine whether said copied packet in said buffer contains signaling information, if said packet is a signaling packet based on said one or more protocols and based on said determined bandwidth value being less than said quality of service processing bandwidth threshold; and
      perform QoS processing for said flow associated with said packet, if said packet contains said signaling information.

14. The intermediate node of claim 13, further comprising a network adapter processing module adapted to process said set of network data from a first network type to a second network type.

15. The intermediate node of claim 14, wherein said first network type is Ethernet and said second network type is PowerLine Communication.

16. The intermediate node of claim 13, wherein said QSFSD module is further adapted to:
   determine whether said packet is a signaling packed based on one or more protocols of said packet, wherein said one or more protocols comprises an Internet Protocol (IP).

17. The intermediate node of claim 16, wherein said QSFSD module is further adapted to:
   transmit said packet to a designated receiver without storing said packet in said buffer, if said packet is not a signaling packet based on said packet not being an IP packet.

18. The intermediate node of claim 16, wherein said QSFSD module is further adapted to:
   determine whether said packet is a signaling packed based on one or more protocols of said packet, wherein said one or more protocols comprises a Transmission Control Protocol (TCP) or a User Datagram Protocol (UDP).

19. The intermediate node of claim 18, wherein said QSFSD module is further adapted to:
   transmit said packet to a designated receiver without storing said packet in said buffer, if said packet is not a signaling packet based on said packet not being a TCP/IP packet or a UDP/IP packet.

20. A system comprising:
   a network comprising one or more network segments;
   an intermediate node device adapted to be connected to a rendering device via said network, the intermediate node comprising:
      a communication module adapted to enable said intermediate node to communicate with said one or more devices via said network; and
      a quality of service stream filtering and signal determination (QSFSD) module adapted to:
         receive a packet via said network, wherein said packet is from a set of network data comprising one or more data flows, each flow comprising one or more packets;
         determine a bandwidth value of said flow;
         determine whether said packet associated with said flow is a signaling packet, wherein said packet is determined to be a signaling packet based on one or more protocols of said packet and based on the determined bandwidth value of said flow being less than a quality of service processing bandwidth threshold comprising a quality of service processing bandwidth threshold value based on a number of bytes processed per second by at least the step of determining whether said packet associated with a flow from said one or more data flows in a signaling packet;
         copy said packet to a buffer, and determine whether said copied packet in said buffer contains signaling information, if said packet is a signaling packet based on said one or more protocols and based on said determined bandwidth value being less than said quality of service processing bandwidth threshold associated; and
         perform QoS processing for said flow associated with said packet, if said packet contains said signaling information; and
   said rendering device adapted to receive said set of network data.

* * * * *